C. WILER.
ELECTRICAL MEASURING INSTRUMENT.
APPLICATION FILED SEPT. 10, 1906.
915,257.
Patented Mar. 16, 1909.
3 SHEETS—SHEET 2.
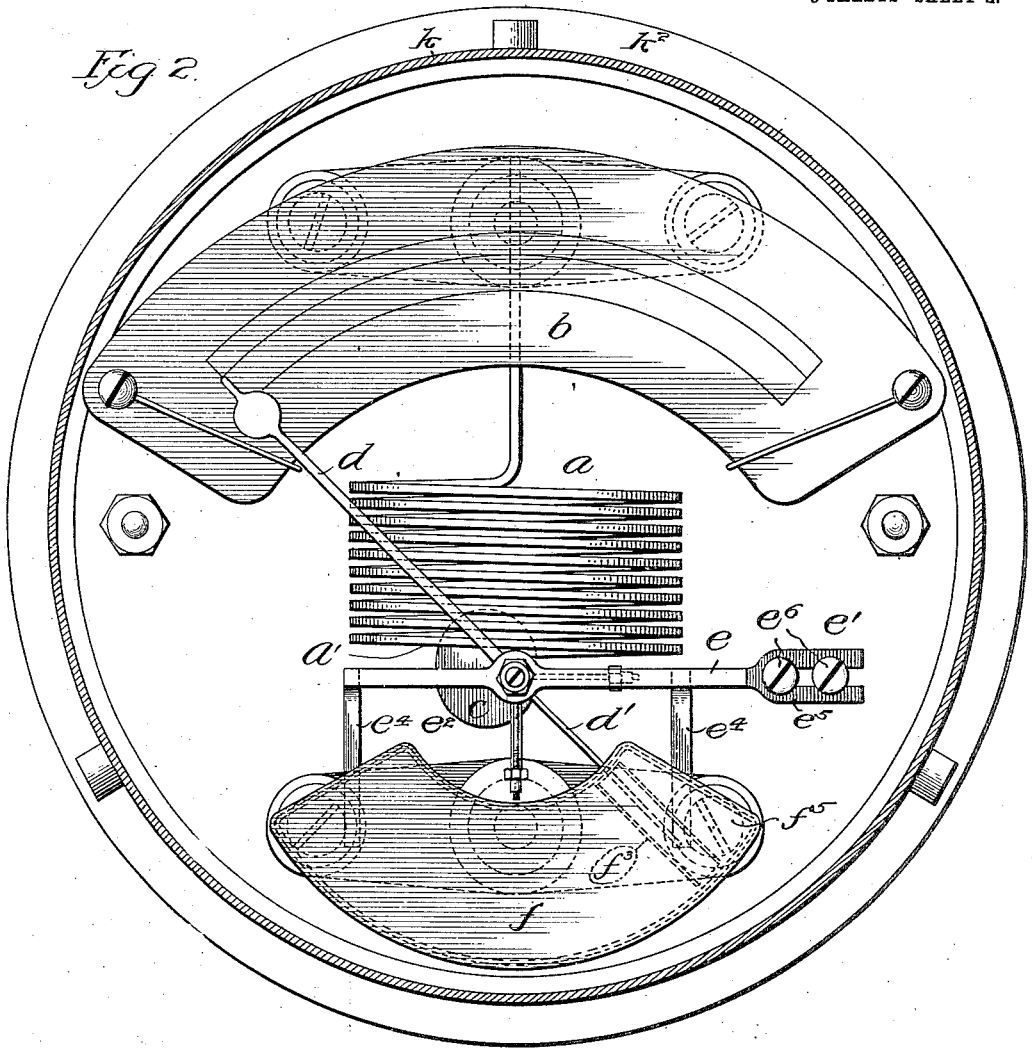
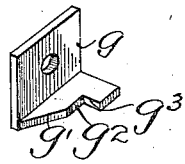
Witnesses:
Inventor:
Carl Wiler,
By Barton, Tanner & Folk,
Attys.

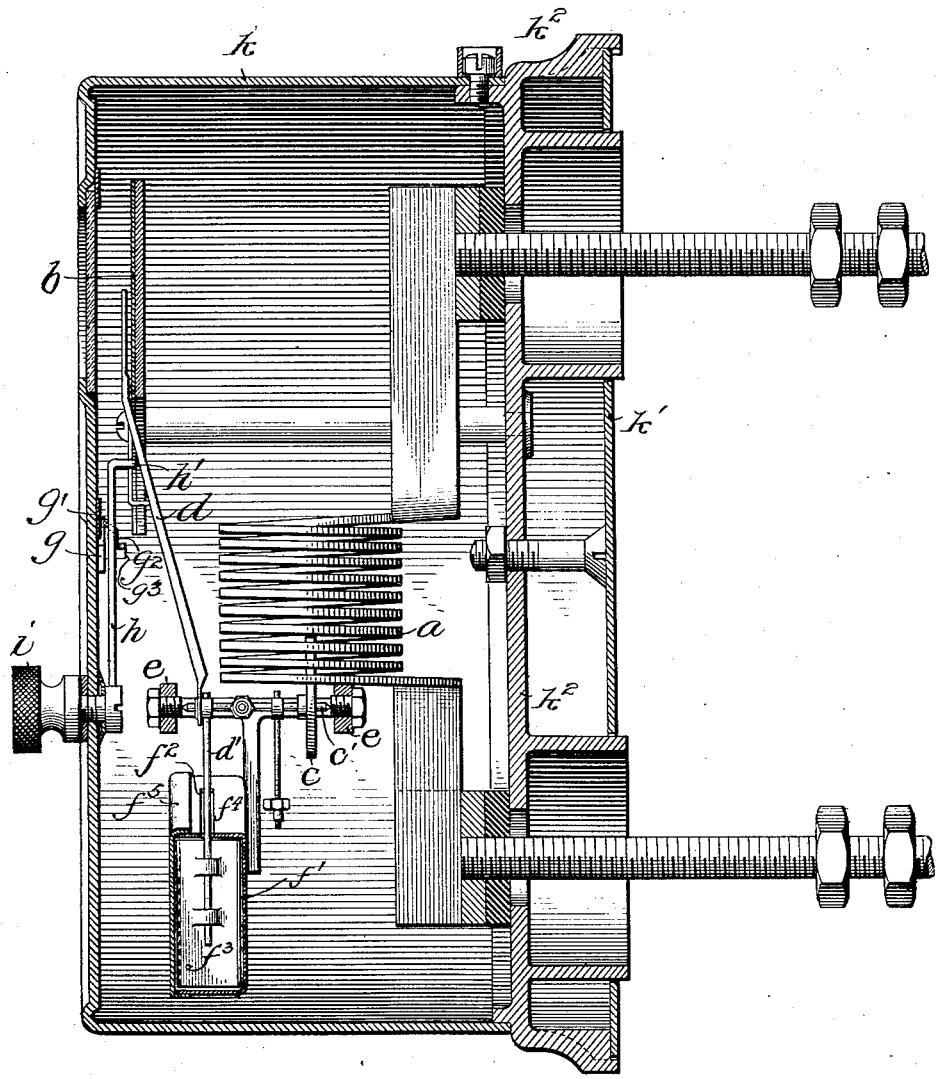

C. WILER.
ELECTRICAL MEASURING INSTRUMENT.
APPLICATION FILED SEPT. 10, 1906.
915,257.
Patented Mar. 16, 1909.
3 SHEETS—SHEET 3.
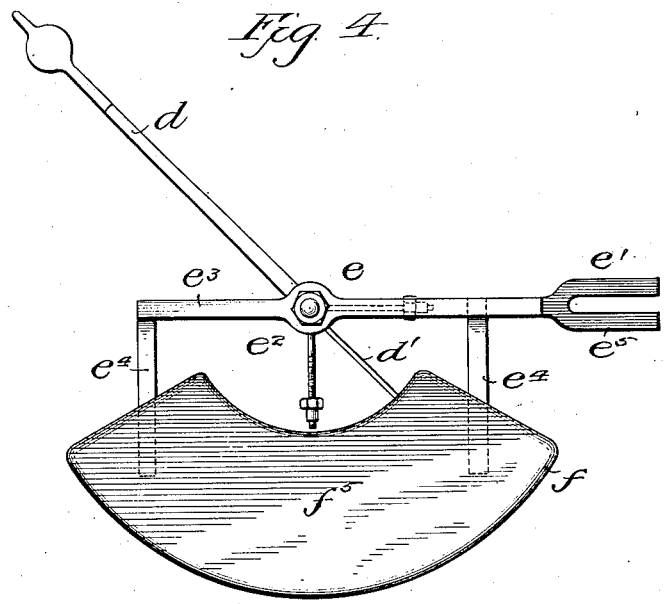
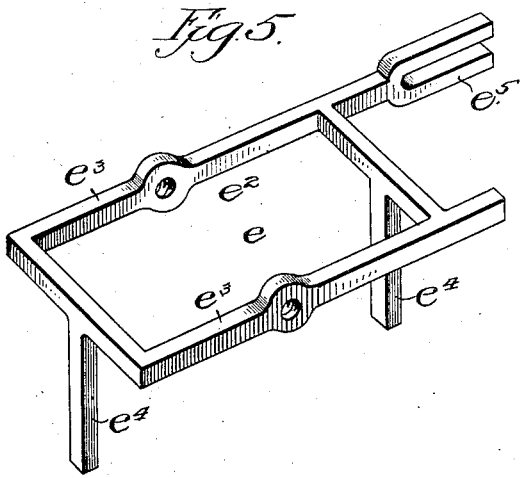
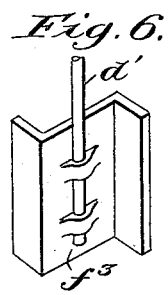
Witnesses:
Inventor:
Carl Wiler,
By Barton, Tanner & Folk,
Attys.

UNITED STATES PATENT OFFICE.

CARL WILER, OF CHICAGO, ILLINOIS, ASSIGNOR TO WESTERN ELECTRIC COMPANY, OF CHICAGO, ILLINOIS, A CORPORATION OF ILLINOIS.

ELECTRICAL MEASURING INSTRUMENT.

No. 915,257. Specification of Letters Patent. Patented March 16, 1909.

Application filed September 10, 1906. Serial No. 334,024.

*To all whom it may concern:*

Be it known that I, CARL WILER, a citizen of the United States, residing at Chicago, in the county of Cook and State of Illinois, have invented a certain new and useful Improvement in Electrical Measuring Instruments, of which the following is a full, clear, concise, and exact description.

My invention relates to electrical measuring instruments, and has for its object to provide an improved instrument which may be placed indiscriminately in alternating and direct current circuits without recalibration, and which will be very accurate in its readings. One feature of my invention consists in the manner of suspension and fastening of the coil and its armature, so as to decrease to a minimum the friction of the moving parts, and increase the efficiency of the instrument. I use a stationary solenoid coil, and pivot the armature or magnetic vane below the coil before the lower opening thereof. I preferably employ a flat solenoid coil so as to bring the active turns thereof as close as possible to the armature. The vane or armature has axes of unequal length, and normally presents its long axis to the coil. When, however, the vane is attracted and drawn within the coil, it presents its shorter axis to the lines of force of the coil. With this arrangement, the hysteresis effects in the armature or vane are reduced to a minimum and the instrument rendered very accurate.

Another feature of my invention consists in the provision of a removable frame within the case adapted to support the indicator needle, pivoted vane and the dash pot. With this arrangement the air - chamber cannot be displaced with respect to its piston, and the frame and its supported parts may be removed from the case as a unit.

A further feature of my invention consists in the provision of means for holding the indicating needle against vibrations during shipment. To this end I provide a cam adapted to engage an arm within the case to cause the same to hold the needle firmly in its zero position.

I will describe my invention more particularly by reference to the accompanying drawings, which illustrate the preferred embodiment thereof, and wherein—

Figure 1 is a vertical sectional view of a measuring instrument embodying my invention; Fig. 2 is a front elevation showing the casing in section; Fig. 3 is a detail perspective view of the cam for locking the needle; Fig. 4 is a view of the removable unit; Fig. 5 is a perspective view of the removable frame, and Fig. 6 is a detail perspective view of the piston hereafter referred to.

The same letters of reference designate the same parts wherever they are shown.

The coil $a$ of the instrument is rigidly mounted below the indicator card or scale $b$, said coil being composed of a flattened wire forming a flat solenoid coil of little impedance. Below the coil is pivoted a magnetic vane or armature $c$ adapted to be drawn within the lower opening $a^1$ of the coil to move an indicator needle $d$ over the scale $b$. By reason of the location of the vane below the coil the friction of the moving parts is reduced to a minimum. The vane $c$ is located immediately before the lower opening of the coil $a$, being pivoted approximately in a central position with respect to said opening, so that the pivotal point of the needle may be located in the central line of the instrument. The vane has axes of unequal length, and is elliptical in form. Said vane is eccentrically pivoted, being preferably mounted upon a shaft $c^1$ pivoted in jeweled bearings in the frame $e$, said shaft being preferably of phosphor bronze so as to reduce the self-induction of the instrument, and increase its efficiency. The shaft $c^1$ also carries the indicator needle $d$. The vane $c$ normally presents its long axis to the coil and when attracted by current in the coil, is rocked on its pivot and drawn within the coil-opening $a^1$, moving the indicator needle over the scale, and presenting a shorter axis to the lines of force of the coil, thus reducing the hysteresis effects to a minimum. Actual tests, carefully conducted, have shown that such result follows from the arrangement indicated. While not confining myself to any particular theory or explanation of the phenomenon, it would seem to be due to the fact that with the shorter axis presented to the line of magnetic force, the poles of the armature of the magnet are thus brought closer together and there is a greater tendency of the opposite poles thereof to neutralize each other than when farther apart, thus largely overcoming the hysteresis effect.

Underneath the shaft $c'$ is located a dash pot $f$, which is associated with the needle $d$, to render the same dead-beat, said dash pot being supported by the frame $e$. The dash pot comprises an arc-shaped air chamber $f^1$ having a slot $f^2$ in its upper concave wall in which an extension or arm $d^1$ from the needle $d$ is adapted to move, said arm preferably extending downwardly from the pivotal point of the needle and being connected with the piston $f^3$ moving within the chamber, said slot serving as an air vent for the chamber. The dash pot thus serves as a damper upon the needle $d$, rendering the same "dead-beat." The frame $e$, which supports the needle, vane and dash pot, is removably secured at $e^1$ to the case, and preferably comprises a main body portion $e^2$ in the arms $e^3$ $e^3$ whereof the shaft $c^1$ is pivoted, said body portion having depending arms $e^4$ to which the air chamber $f^1$ is secured. An extension $e^5$ of the body portion is secured to the frame of the case by screws $e^6$, or in any suitable manner. With this construction, the frame and its supported parts may be conveniently removed as a unit from the case, and when in place the air chamber is maintained in proper relation to its piston. The air chamber $f^1$ preferably comprises a body portion $f^4$ stamped from a single piece of material, being open at its side, and provided with a cover $f^5$ adapted to fit upon said body portion. The piston $f^3$ is preferably an angular blade whose sides engage the walls of the chamber, and form a Z-shaped piston, said angular sides preventing air from leaking past the blade or piston and so impairing the efficiency of the dash-pot.

In order to prevent vibrations of the indicator needle during shipment, which might injure the pivots of the moving parts, I provide a cam $g$ adapted to be engaged by an arm $h$, to lock the needle in its zero position against vibration. The arm $h$, which, when applied to a voltmeter, may serve as an index finger, is located between the needle and the front wall of the case, and is adapted to be moved from the outside of the case by a button $i$, to ride up onto the cam $g$, which is also mounted upon the front wall of the case. The arm $h$ carries a finger $h^1$, which, when the arm rests upon said cam, is interposed in the path of the needle and engages the same to lock it in its zero position. The cam $g$ is provided with an inclined portion $g^1$ up which the arm rides into the seat $g^2$, being held against further movement in such direction by a stop $g^3$.

I preferably make the front and sides of the casing of a single piece $k$ of stamped sheet metal. I preferably make the piece $k$ of iron and secure a piece $k^1$ of sheet iron to the rear wall $k^2$ of the casing, so as to protect the coil $a$ from stray fields.

I claim:

1. In an electrical measuring instrument, the combination with a flat solenoid coil, of a magnetic vane having axes of unequal length, pivoted below said coil, and adapted to be rocked by current in said coil, said vane normally presenting its long axis to said coil and when rocked by current in said coil presenting a shorter axis thereto, and an indicator moving with said vane.

2. In an electrical measuring instrument, the combination with a flat solenoid coil, of an elliptical magnet vane or armature eccentrically pivoted below said coil, before the lower opening thereof, and an indicator operated by the movement of said vane.

3. In an electrical measuring instrument, the combination with a solenoid coil, of a magnetic vane having axes of unequal length, eccentrically pivoted below said coil before the lower opening thereof, said vane normally presenting its long axis to the coil, and when drawn within the coil by current in said coil, presenting a shorter axis thereto, and an indicator needle operated by said vane when rocked.

4. In an electrical measuring instrument, the combination with a flat solenoid coil, of a rocking shaft below the coil, an elliptical magnetic vane having unequal axes, eccentrically pivoted at approximately a central position with respect to the lower opening of said coil, said vane normally presenting its longest axis to said coil and when attracted and rocked by current in said coil presenting a shorter axis to the lines of force of the coil, and an indicator needle pivoted upon said shaft.

5. In an electrical measuring instrument, the combination with a casing, of a solenoid coil, a magnetic vane responsive to current in said coil, an indicator needle moved by said vane, a dash pot for rendering said needle dead-beat, and a frame removably secured within said casing and supporting said needle, vane and dash-pot.

6. In an electrical measuring instrument, the combination with a casing, of a solenoid coil, a magnetic vane pivotally supported before the opening of said coil, an indicator needle moving with said vane, an air-chamber, a Z-shaped piston within said chamber connected with said needle to move therewith, and a frame removably secured within said casing and forming a mounting for said needle, vane, and air-chamber.

7. In a measuring instrument, the combination with the case thereof, of an indicating needle therein, a cam upon the inner surface of the front of said case, and an arm adapted to be operated from the outside of the case to engage said cam to lock said needle in its zero position against vibration.

8. In a measuring instrument, the combination with the case thereof, of an indicating needle therein, a cam upon the inner surface of the front of said case, an arm between said needle and the front of the case, adapted to be rocked from the outside of the case, said arm being adapted when moved to ride up onto said cam, and an angular finger carried by said arm adapted when said arm rests upon the cam to prevent vibration of the needle in its zero position.

9. In a measuring instrument, the combination with the case thereof, of an indicating needle therein, a cam within the case, an arm adapted to be moved into engagement with said cam and to be held thereby in position to lock the indicator needle against vibration, and means for operating said arm from the outside of the case.

10. In an electrical measuring instrument, the combination with a solenoid coil, of a magnetic vane having axes of unequal length, said vane being mounted in position to be rocked by current in said coil, said vane normally presenting its long axis to said coil, and when rocked by current in said coil presenting a shorter axis thereto, and an indicator moving with said vane.

11. In an electrical measuring instrument, the combination with a solenoid coil, of an elliptical magnetic vane or armature eccentrically pivoted before an opening of said coil, and an indicator operated by the movement of said coil.

12. In an electrical measuring instrument, the combination with a solenoid coil, of a magnetic vane having axes of unequal length eccentrically pivoted before an opening of said coil, said vane normally presenting its long axis to the coil, and when drawn within the coil by current in said coil presenting a shorter axis thereto, and an indicator needle operated by said vane when rocked.

13. In an electrical measuring instrument, the combination with a solenoid coil, of a rocking shaft mounted across the opening of said coil, an elliptical magnetic vane having unequal axes eccentrically pivoted on said shaft at approximately a central position with respect to the opening of said coil, said vane normally presenting its longest axis to said coil and when attracted and rocked by current in said coil presenting a shorter axis to the lines of force of the coil, and an indicator needle pivoted upon said shaft.

In witness whereof, I, hereunto subscribe my name this 28th day of August A. D., 1906.

CARL WILER.

Witnesses:
C. A. COGGIN,
GEORGE P. BARTON.